(12) United States Patent
Bearinger et al.

(10) Patent No.: US 11,325,517 B2
(45) Date of Patent: May 10, 2022

(54) TAILGATE APPARATUS FOR DUMP TRUCKS AND DUMP TRAILERS

(71) Applicant: BearClaw Equip Inc., Moorefield (CA)

(72) Inventors: Elwin Bearinger, Moorefield (CA); Darrell Shartner, Listowel (CA)

(73) Assignee: BEARCLAW EQUIP INC., Moorefield (CA)

( * ) Notice: Subject to any disclaimer, the term of this patent is extended or adjusted under 35 U.S.C. 154(b) by 79 days.

(21) Appl. No.: 16/749,569

(22) Filed: Jan. 22, 2020

(65) Prior Publication Data
US 2020/0231078 A1    Jul. 23, 2020

Related U.S. Application Data

(60) Provisional application No. 62/795,792, filed on Jan. 23, 2019.

(51) Int. Cl.
*B60P 1/273*    (2006.01)

(52) U.S. Cl.
CPC .................... *B60P 1/273* (2013.01)

(58) Field of Classification Search
CPC ... B60P 1/273; B62D 33/0273; B62D 33/023; B62D 33/027; E05Y 2900/544
USPC ........................................................ 296/57.1
See application file for complete search history.

(56) References Cited

U.S. PATENT DOCUMENTS

| 3,554,398 | A | * | 1/1971 | Nickel | B60P 1/003 414/679 |
| 3,905,493 | A | | 9/1975 | Logue | |
| 5,474,363 | A | * | 12/1995 | Hagenbuch | B60P 1/16 298/23 DF |
| 5,887,914 | A | * | 3/1999 | Hagenbuch | B60P 1/267 298/23 R |
| 6,491,349 | B2 | * | 12/2002 | McCafferty | B60P 1/26 298/23 D |

\* cited by examiner

*Primary Examiner* — Hilary L Gutman
(74) *Attorney, Agent, or Firm* — Bereskin & Parr LLP

(57) ABSTRACT

A tailgate apparatus for a dump body is described herein. The dump body includes a floor, a front wall coupled to and extending upwardly from the floor and two opposing side walls coupled to and extending upwardly from the floor. Each side wall is coupled to the front wall. The two side walls define an opening at a rear end of the floor. The tailgate apparatus includes a tailgate sized to cover the opening and two opposed side arms extending from the tailgate towards the front wall. Each side arm is pivotally coupled to a respective one of the side walls. The tailgate apparatus also includes a pair of linkages for linking the side arms to the side walls. The linkages enable the tailgate to pivot between a closed position where the tailgate covers the opening and an open position where the tailgate is positioned closer to the front wall than the opening.

21 Claims, 10 Drawing Sheets

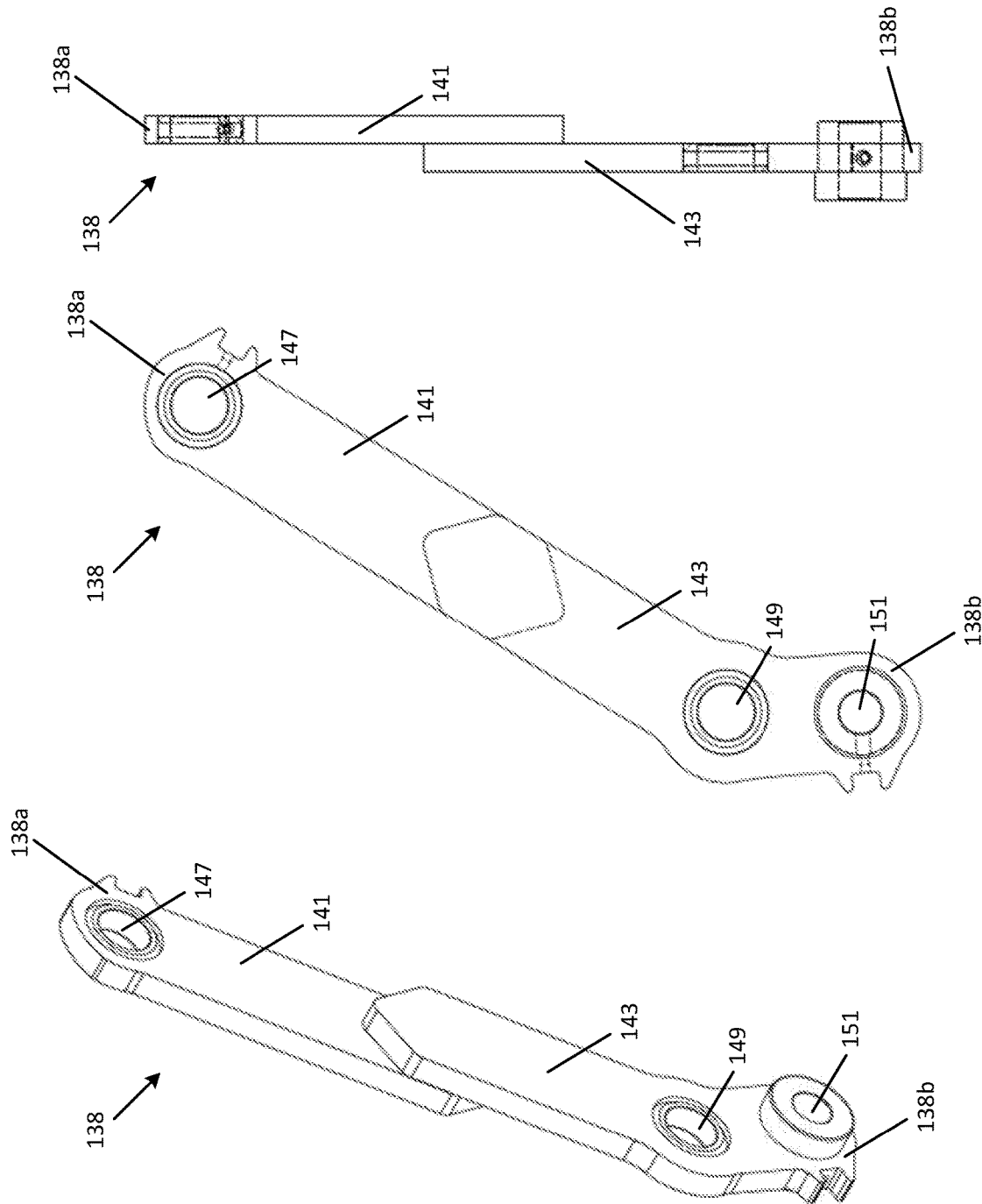

TAILGATE APPARATUS FOR DUMP TRUCKS AND DUMP TRAILERS

CROSS-REFERENCE TO RELATED APPLICATION

This application claims the benefit of U.S. Provisional Patent Application No. 62/795,792, filed Jan. 23, 2019, the entire contents of which are hereby incorporated herein by reference.

TECHNICAL FIELD

The embodiments disclosed herein relate to dump trucks and dump trailers and, in particular, to tailgates for dump trucks and dump trailers.

BACKGROUND

Dump trucks and dump trailers have dump bodies that are configured for transporting and discharging debris such as tree stumps, rocks, dirt, and sand. The dump bodies typically include tailgates that pivot about a horizontal axis that extends along the top, rear portion of the body. These conventional tailgates rotate between a closed position where the tailgate covers a rear opening of the body and an open position where the rear opening is uncovered.

The size of the rear opening is limited by the position of the tailgate when the tailgate is in the open position. In conventional tailgates that pivot about a horizontal axis that extends along at the top, rear portion of the dump body, when in the open position, the tailgate limits the size of the opening to being about the same size as a front wall of the body.

By limiting the size of the rear opening, conventional tailgates limit the size of objects that can be effectively transported and discharged by the dump truck or dump trailer. For instance, when the dump truck or trailer is being used for transporting and discharging large debris such as tree stumps and large rocks, conventional tailgates limit the size of the tree stumps and large rocks that can be transported and discharged.

Other tailgates have been developed that increase the size of the opening at the rear portion of the body by elevating the tailgate above the side walls of the body when the tailgate is in the open position. However, these tailgates still limit the size of the opening as the tailgate is not completely removed from the path that large debris such as tree stumps and large rocks take as they are discharged from the body.

Accordingly, there is a need for a dump truck or trailer with a tailgate that is movable to be clear of a path that large debris such as tree stumps and large rocks take as they are discharged from the body.

SUMMARY

According to some embodiments, a tailgate apparatus for a dump body is described herein. The dump body includes a floor having a front end, a rear end and two opposed sides, a front wall coupled to the floor and extending upwardly from the floor at the front end, two opposing side walls extending upwardly from the floor, each side wall coupled to the floor at a respective side of the floor and coupled to the front wall, the two side walls defining an opening at the rear end of the floor. The tailgate apparatus includes a tailgate sized to cover the opening; two opposed side arms extending from opposing sides of the tailgate towards the front wall, each side arm pivotally coupled to a respective one of the side walls at a side arm pivot point; and a pair of linkages for linking the side arms to the side walls, the linkages being configured to enable the tailgate to pivot between a closed position where the tailgate covers the opening and an open position where the tailgate is positioned closer to the front wall than the opening.

Each of the linkages may include a first link arm having a first end and a second end, the first end pivotally coupled to the side wall at a first pivot point spaced rearwardly a selected distance from the side arm pivot point; a second link arm having a first end and a second end, the first end coupled to the side arm at a second pivot point spaced from the side arm pivot point and the second end coupled to the first link arm near the second end of the first link arm; and an actuator having a forward end and a rearward end, the rearward end pivotally coupled to the side wall at a rear end of the side wall and the forward end being pivotally coupled to the second end of the first link arm.

Each side arm may pivot about a side arm pivot axis at the side arm pivot point.

Each first link arm may pivot about a first link arm pivot axis at the first pivot point.

The second link arm may pivot about a second link arm pivot axis at the second pivot point.

The second pivot point may be forwardly spaced from the side arm pivot point when the tailgate is in the closed position.

The second pivot point may be upwardly spaced from the side arm pivot point when the tailgate is in the closed position.

The second pivot point may be rearwardly spaced from the side arm pivot point when the tailgate is in the open position.

The second pivot point may be downwardly spaced from the side arm pivot point when the tailgate is in the open position.

The second pivot point may be forwardly spaced from the first pivot point.

The side arm pivot point may be forwardly spaced from the first pivot point.

The side arm pivot axis may be parallel to the first link arm pivot axis.

The second link arm may have an arcuate shape.

According to some embodiments, a dump body is described herein. The dump body includes a floor having a front end, a rear end and two opposed sides; a front wall coupled to the floor and extending upwardly from the floor at the front end; two opposing side walls extending upwardly from the floor, each side wall coupled to the floor at a respective side of the floor and coupled to the front wall, the two side walls defining an opening at the rear end of the floor; and a tailgate apparatus for the dump body, the tailgate apparatus including: a tailgate sized to cover the opening; two opposed side arms extending from opposing sides of the tailgate towards the front wall, each side arm pivotally coupled to a respective one of the side walls at a side arm pivot point; and a pair of linkages for linking the side arms to the side walls, the linkages being configured to enable the tailgate to pivot between a closed position where the tailgate covers the opening and an open position where the tailgate is positioned closer to the front wall than the opening.

According to some embodiments, a vehicle is described herein. the vehicle includes a dump body including a floor having a front end, a rear end and two opposed sides; a front wall coupled to the floor and extending upwardly from the floor at the front end; two opposing side walls extending upwardly from the floor, each side wall coupled to the floor at a respective side of the floor and coupled to the front wall, the two side walls defining an opening at the rear end of the floor; and a tailgate apparatus for the dump body, the tailgate apparatus including: a tailgate sized to cover the opening; two opposed side arms extending from opposing sides of the tailgate towards the front wall, each side arm pivotally coupled to a respective one of the side walls at a side arm pivot point; and a pair of linkages for linking the side arms to the side walls, the linkages being configured to enable the tailgate to pivot between a closed position where the tailgate covers the opening and an open position where the tailgate is positioned closer to the front wall than the opening.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 9A to 9C show perspective, side and front views, respectively, of a first link arm of the tailgate apparatus of FIG. 1.

The skilled person in the art will understand that the drawings, further described below, are for illustration purposes only. The drawings are not intended to limit the scope of the applicant's teachings in any way. Also, it will be appreciated that for simplicity and clarity of illustration, elements shown in the figures have not necessarily been drawn to scale. For example, the dimensions of some of the elements may be exaggerated relative to other elements for clarity. Further aspects and features of the example embodiments described herein will appear from the following description taken together with the accompanying drawings.

DETAILED DESCRIPTION

Various systems or methods will be described below to provide an example of each claimed embodiment. No embodiment described below limits any claimed embodiment and any claimed embodiment may cover systems or methods that differ from those described below. The claimed embodiments are not limited to systems or methods having all of the features of any one systems or methods described below or to features common to multiple or all of the systems or methods described below.

Generally, a tailgate apparatus having a flip-over tailgate is described herein. The tailgate apparatus can be installed on a dump body of a vehicle or a trailer to control movement of a tailgate between open and closed positions. In the closed position, the flip-over tailgate covers an opening formed between two upstanding side walls of the dump body. In the open position, the tailgate is cleared from the opening to provide for large debris contained in the dump body to be discharged from the dump body through the opening without being obstructed by the flip-over tailgate.

Figure 1:
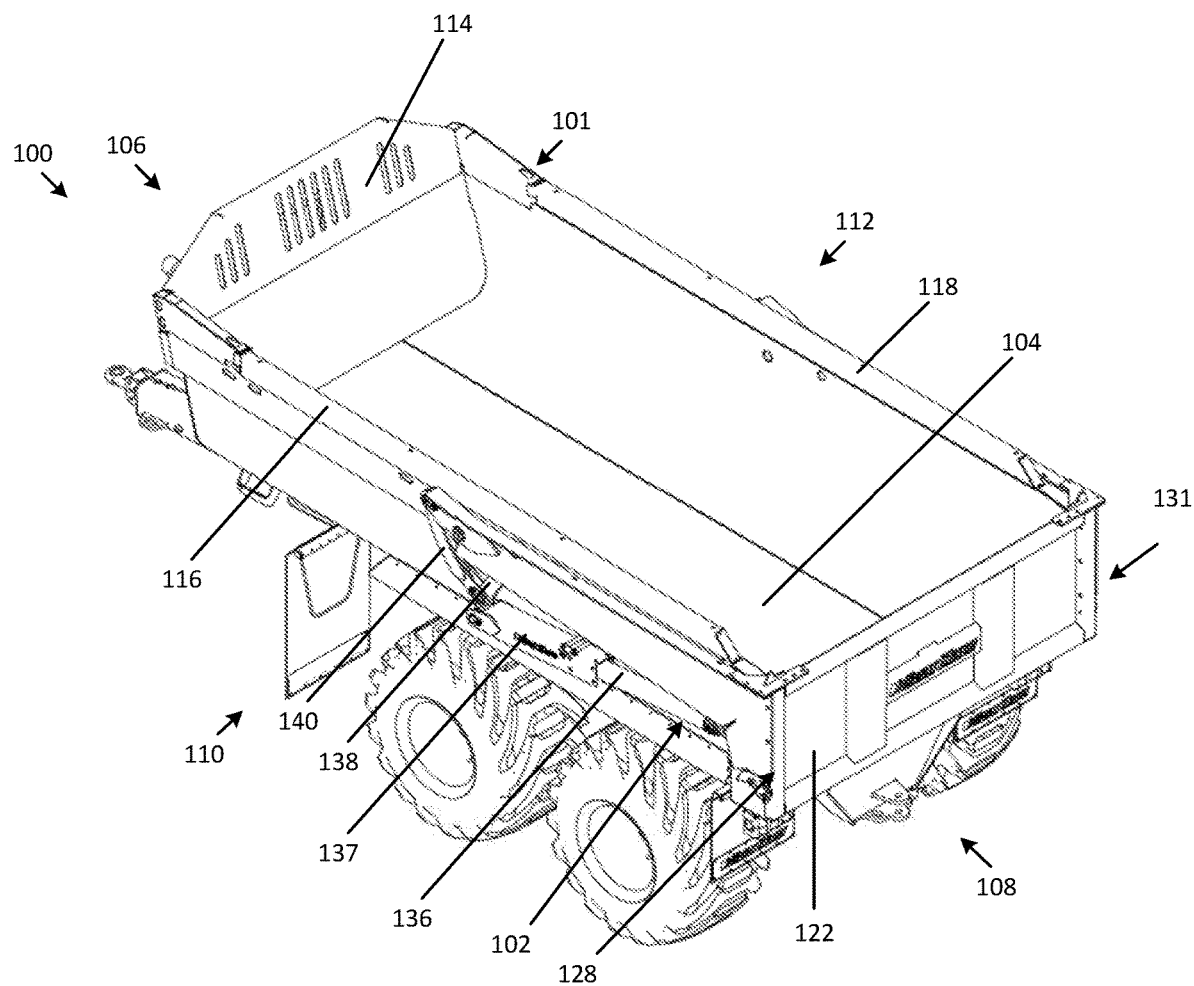
FIG. 1 is a rear perspective view of a dump trailer with a tailgate apparatus shown in the closed position.
Figure 2:
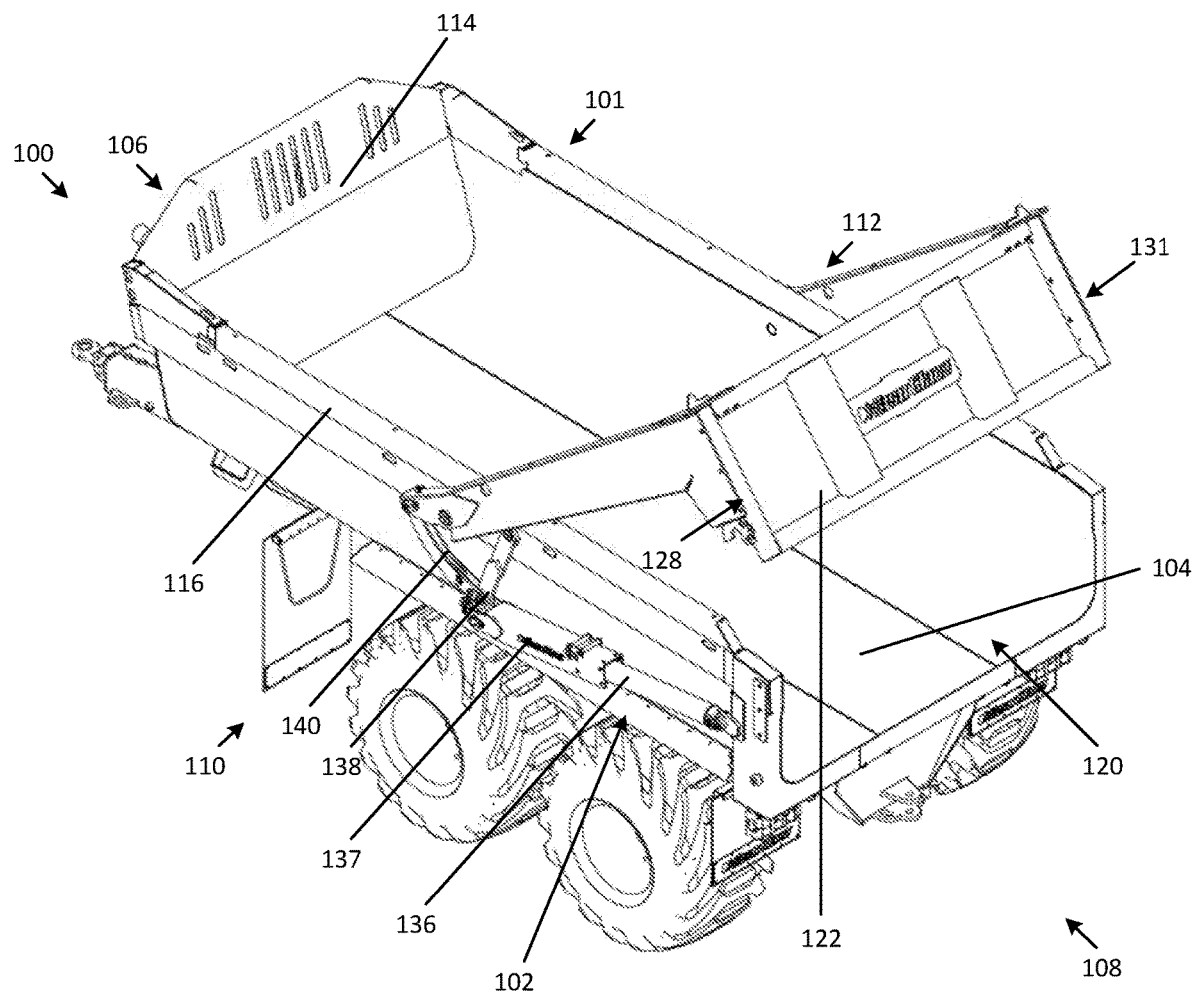
FIG. 2 is a rear perspective view of the dump trailer and tailgate apparatus of FIG. 1 shown in a partially open position.
Figure 3:
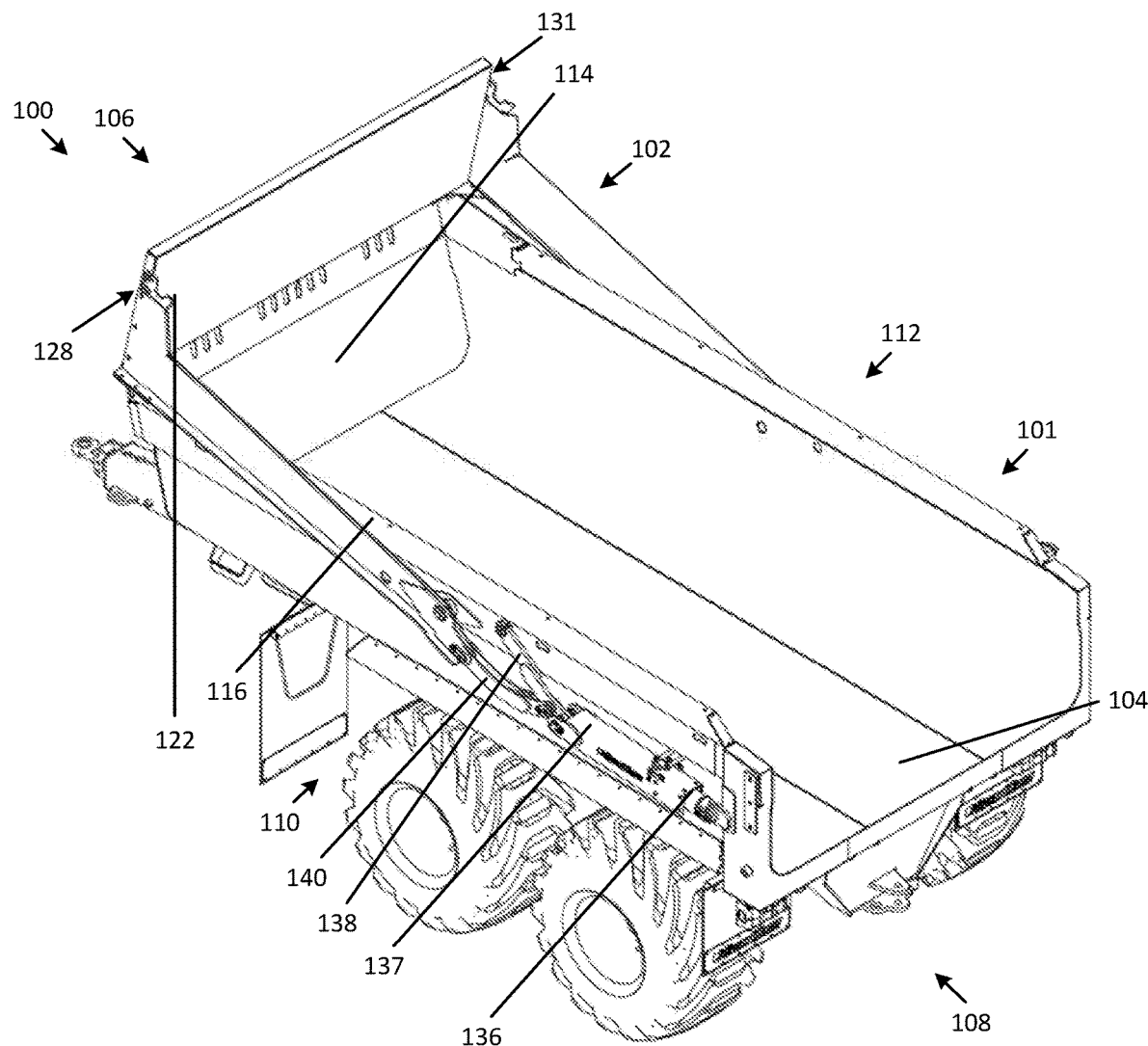
FIG. 3 is a rear perspective view of the dump trailer and tailgate apparatus of FIG. 1 shown in an open position.

Referring now to the drawings, FIGS. 1 to 3 show rear perspective views of a dump trailer 100 having a dump body 101 fitted with a tailgate apparatus 102. As noted above, the tailgate apparatus 102 can also be provided to a vehicle such as but not limited to a dump truck, a dump trailer, or any other apparatus having a dump body for transporting and discharging contents.

The dump trailer 100 includes dump body 101 having a floor 104, a front end 106, a rear end 108 and two opposed sides 110, 112. A front wall 114 is coupled to the floor 104 at a front end 106. Front wall 114 extends upwardly from the floor 104 at the front end 106. The dump body 101 also includes two opposing side walls 116, 118 extending upwardly from the floor 104 at the sides 110, 112, respectively. Each side wall 116, 118 is coupled to the floor 104 along a length of the dump body 101. Each side wall 116, 118 is also coupled to the front wall 114 at one of two opposing sides of the front wall 114. The two side walls 116, 118 define an opening 120 at the rear end 108 of the dump body 101.

FIGS. 1 to 3 show the tailgate apparatus 102 in a closed position, a partially open position and an open position, respectively. Specifically, FIG. 1 shows tailgate apparatus 102 in a closed position when a tailgate 122 of the tailgate apparatus 102 is covering opening 120 at rear end 108. FIG. 2 shows the tailgate apparatus 102 in a partially open position when tailgate 122 is partially rotated upwardly relative to the floor 104 and/or the side walls 116, 118. FIG. 3 shows the tailgate apparatus 102 in an open position where the tailgate 122 has rotated upwardly relative to the floor 104 and/or side walls and passed over at least a portion of the floor 104 and the side walls 116, 118 to a position nearer to the front wall 106 than the opening 120. In some embodiments, tailgate 122 rests either on or adjacent to front wall 114 when the tailgate apparatus 102 is in the open position. Further, when the tailgate apparatus 102 is in the open position, contents (e.g. debris) housed in the dump body 101 can generally be discharged from the dump body 101 without being obstructed or impeded by the tailgate 122. For instance, in some embodiments when the contents are large debris (such as but not limited to tree stumps or large rocks) that, when resting on the floor 104 of the dump body 101 extend upwardly beyond a height of the side walls 116, 118 of the dump body 101, the large debris can pass from the dump body 101 and through the opening 120 without contacting the tailgate apparatus 102.

Figure 4:
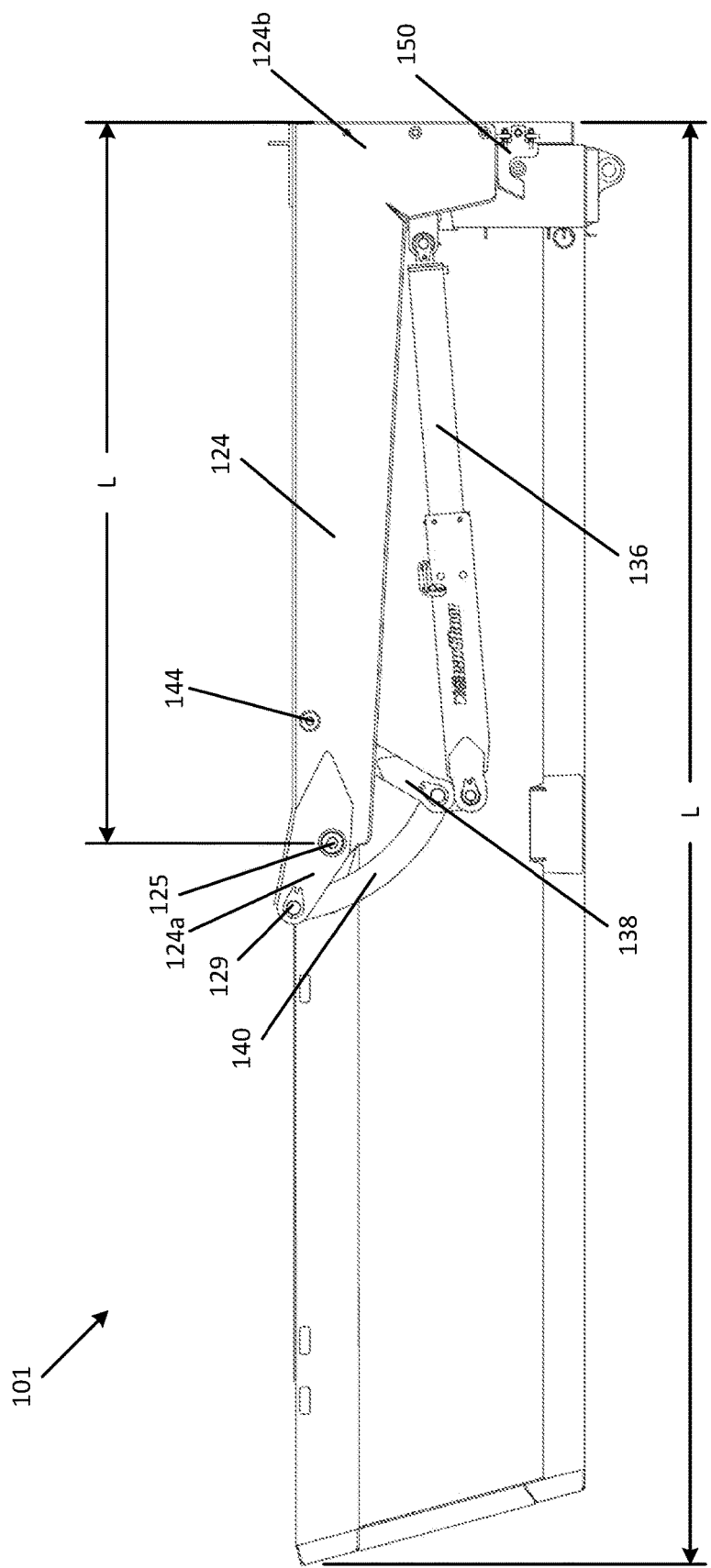
FIG. 4 is a side view of the dump body and tailgate apparatus of FIG. 1 shown in the closed position.
Figure 5:
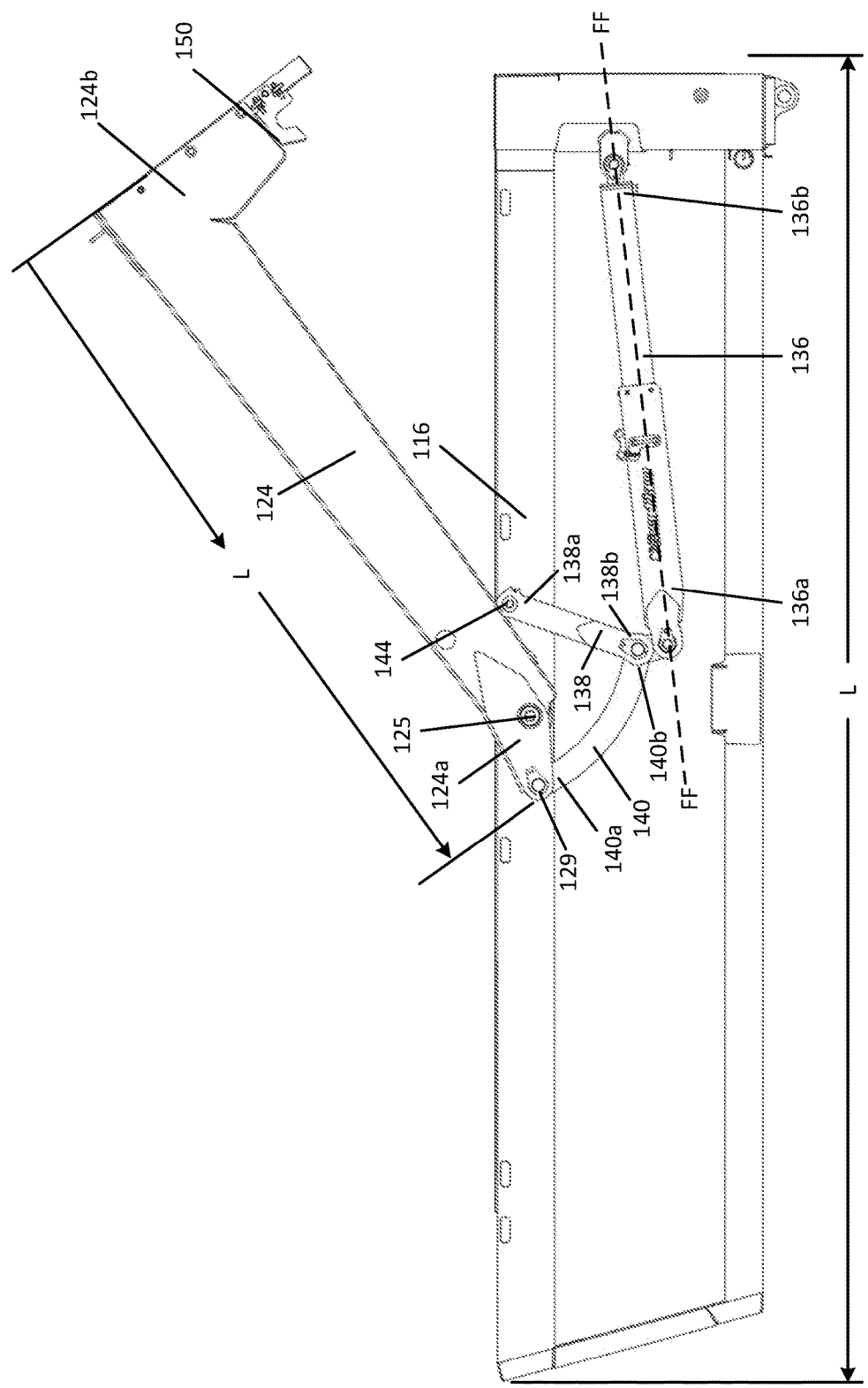
FIG. 5 is a side view of the dump body and tailgate apparatus of FIG. 1 shown in the partially open position.
Figure 6:
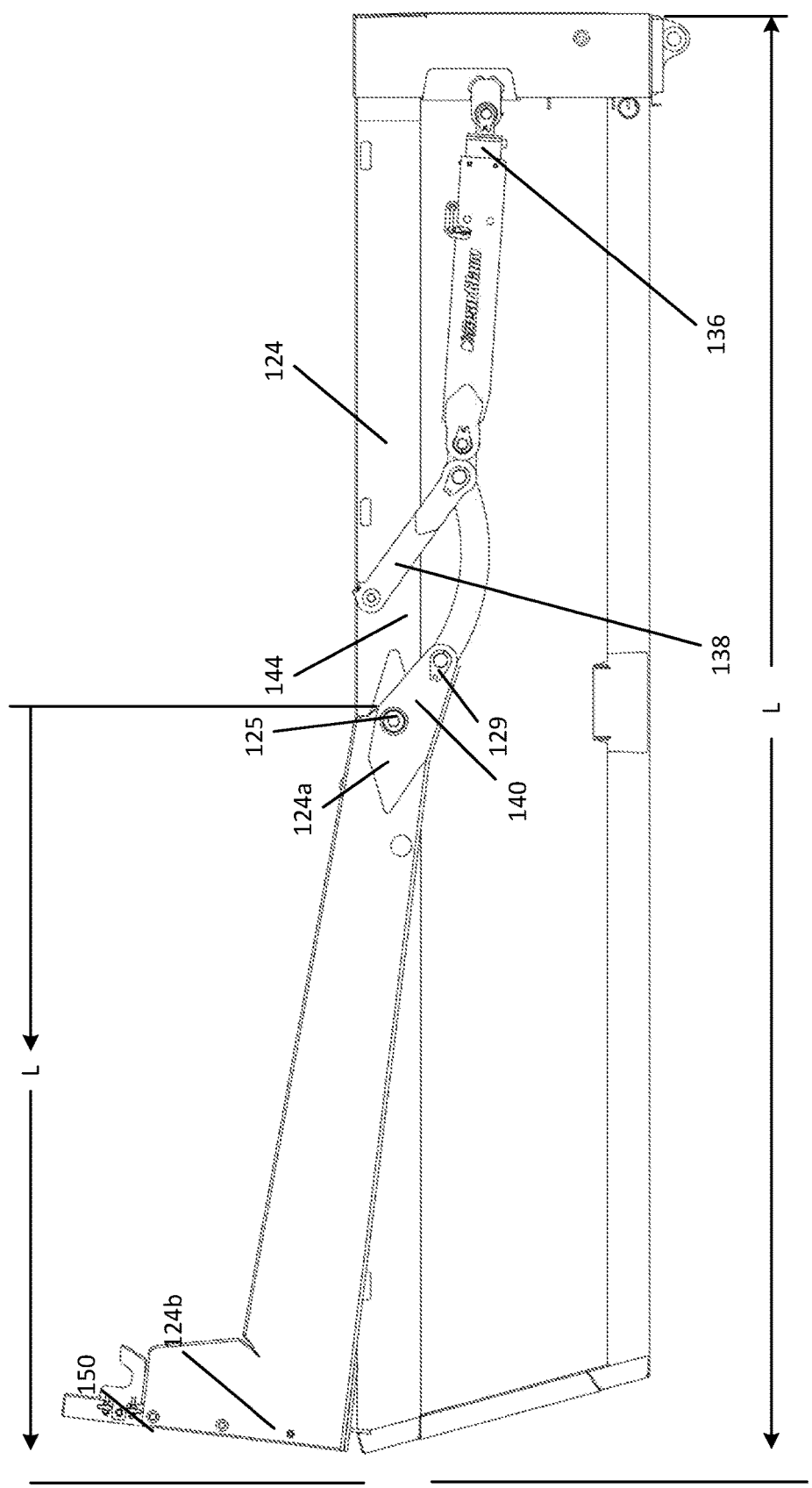
FIG. 6 is a side view of the dump body and tailgate apparatus of FIG. 1 shown in an open position.

FIGS. 4 to 6 show side views of the dump body 101 when the tailgate apparatus 102 is in closed, partially open and open positions, respectively.

Figure 7:
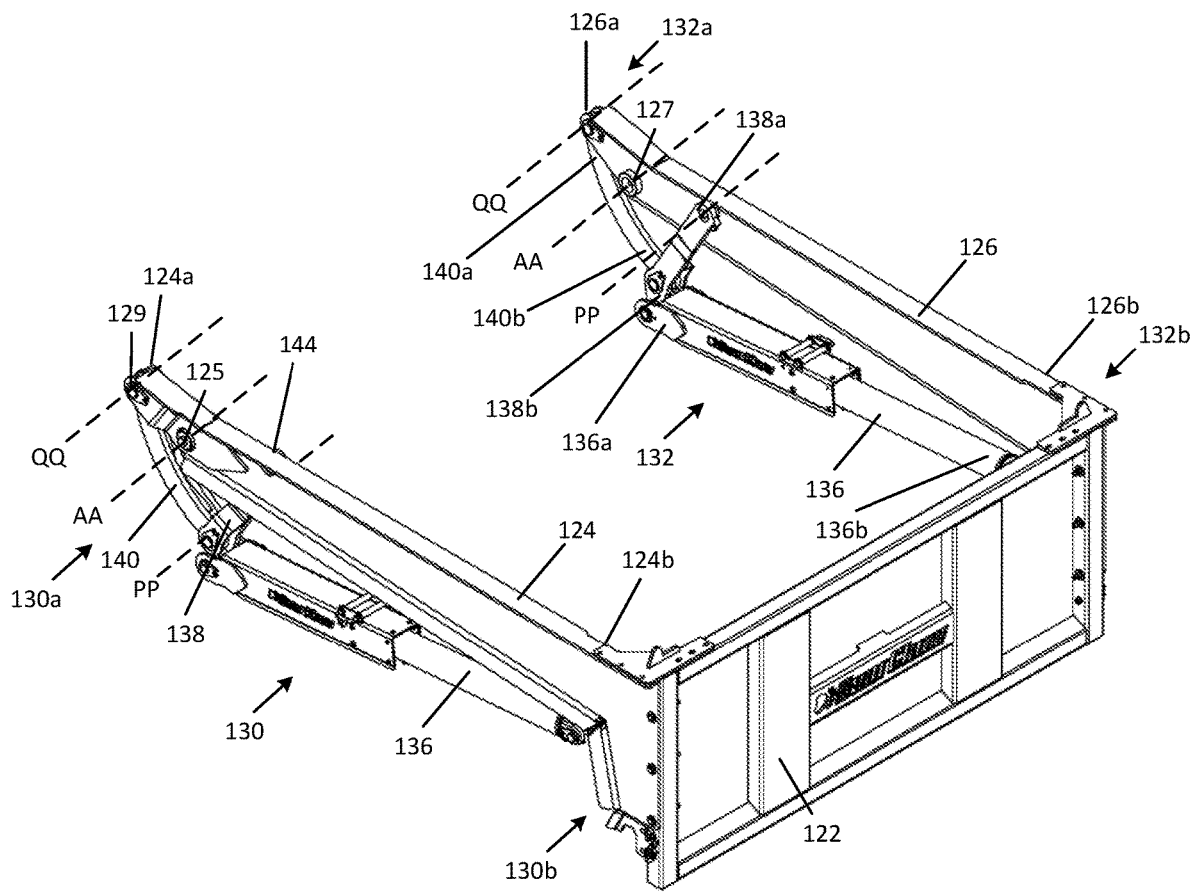
FIG. 7 is a rear perspective view of the tailgate apparatus of FIG. 1.
Figure 8:
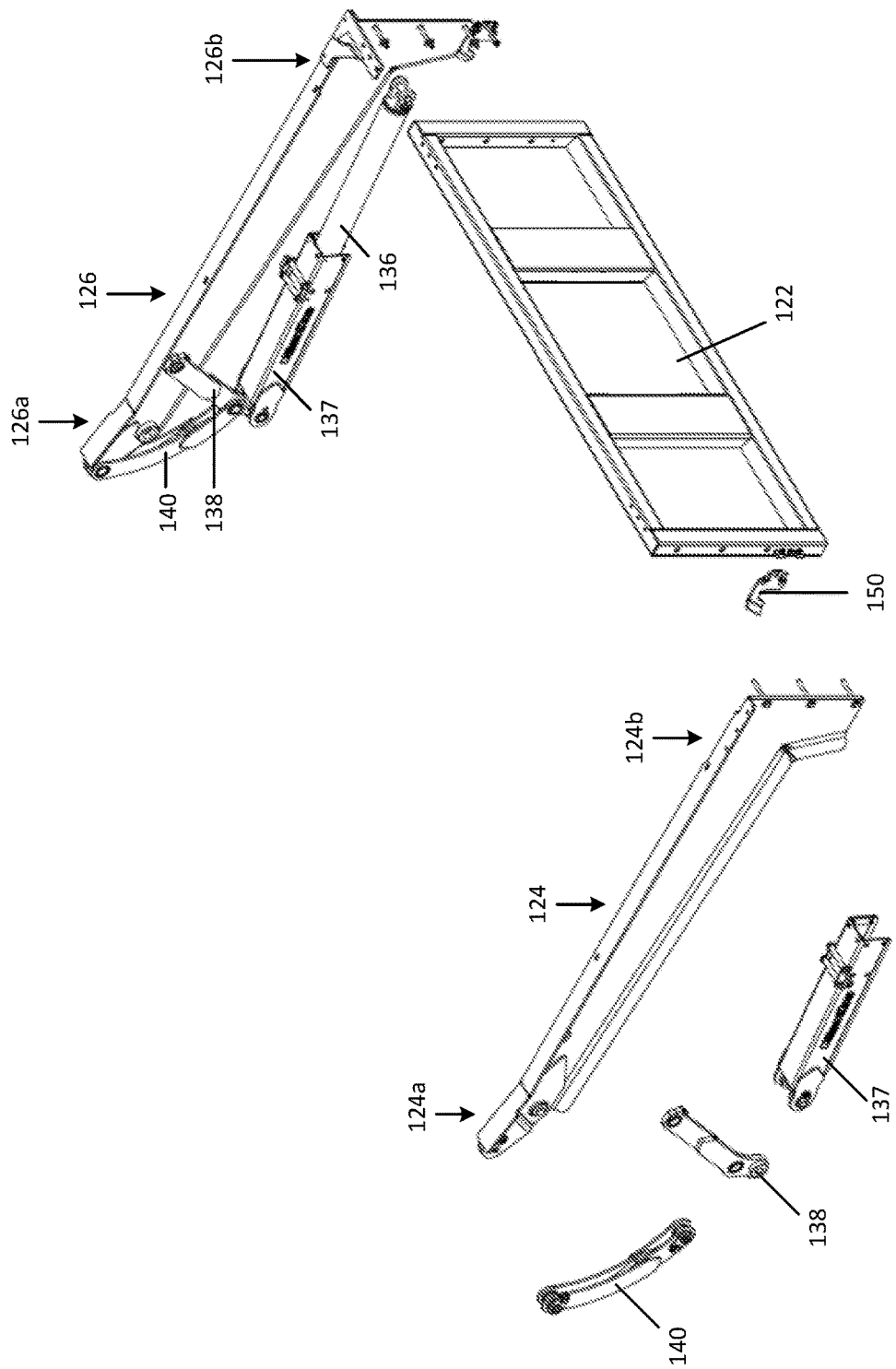
FIG. 8 is an exploded rear perspective view of the tailgate apparatus of FIG. 1.

Referring now to FIGS. 7 and 8, illustrated therein are a rear perspective view and an exploded rear perspective view, respectively, of the tailgate apparatus 102, according to one embodiment. Tailgate apparatus 102 includes the tailgate 122, two opposed side arms 124, 126 and two linkages 130, 132. Each of the side arms 124, 126 extends from opposing sides 128, 131 of the rear wall 102 towards the front wall 114. Side arm 124 has a forward end 124a that is pivotally coupled to side wall 116 at a side arm pivot point 125. Side arm 126 has a first end 126a that is pivotally coupled to side wall 118 at a side arm pivot point 127. Tailgate apparatus 102 pivots between the closed position and the open position about a side arm pivot axis AA that passes through both of side arm pivot point 125 and side arm pivot point 127.

Each of side arms 124, 126 have a length L (see FIGS. 4 to 6). Length L may be configured to provide for clearance of the tailgate 122 of the tailgate apparatus 102 as the tailgate apparatus 102 rotates between the open and closed positions. For instance, in the embodiments shown in the Figures, length L of each of side arms 124, 126 is about one-half of a length LL of the dump body 101. Accordingly, rotation of the tailgate apparatus 102 between the closed position and the open position results in the tailgate 122 of the tailgate apparatus 102 resting on or adjacent to the front wall 114 (e.g. tailgate 122 of the tailgate apparatus 102 may rest on the front wall 114, on the side walls 116, 118 adjacent to the front wall 114 or may be suspended above the side walls 116, 118 adjacent to the front wall 114 when in the open position). Accordingly, length L of the side arms 124, 126 generally determines a position where the tailgate 122 rests when in the open position.

Rotation of the tailgate apparatus 102 is controlled by the linkages 130, 132 (see FIG. 7). Linkages 130, 132 are configured to rotate the tailgate apparatus 102 between the closed position and the open position. In the embodiment shown in the drawings, linkage 130 is coupled to side wall 116 and side arm 124 and linkage 132 is coupled to side wall 118 and side arm 126. Linkage 130 has a forward end 130a and a rearward end 130b and linkage 132 has a forward end 132a and a rearward end 132b.

FIG. 8 shows an exploded rear perspective view of the tailgate apparatus 102. As shown therein, each of the linkages 130, 132 has an actuator 136, a first link arm 138 and a second link arm 140.

With respect to linkage 130, first link arm 138 has a first end 138a and a second end 138b (see FIGS. 9A-C). First link arm 138 includes an upper link arm member 141 and a lower link arm member 143. Upper link arm member 141 includes an upper aperture 147 and lower link arm member 143 includes a lower aperture 149 and a protruding portion 151.

First end 138a is pivotally coupled to side wall 116 via upper aperture 147 at a first pivot point 144. Second end 138b is pivotally coupled to a forward end of the actuator 136 via protruding portion 151. First arm 138 is also coupled to a second end 140b of the second link arm 140 via lower aperture 149. In the embodiments shown in the drawings, second end 140b of the second link arm 140 is pivotally coupled to the first link arm 138 via lower aperture 149 near second end 138b of the first link arm 138.

First link arm 138 pivots about a first pivot axis PP passing through the first pivot point 144. First pivot point 144 (and therefore first pivot axis PP) is spaced apart from the side arm pivot point 125 (and therefore side arm pivot axis AA). As shown, first pivot point 144 is spaced apart from the side arm pivot point 125 in a rearward direction and by a selected distance.

With respect to linkage 132, first link arm 138 has a first end 138a pivotally coupled to side wall 118. The remaining components and connections of linkage 132 are the same as previously described with reference to linkage 130.

Figure 10C:
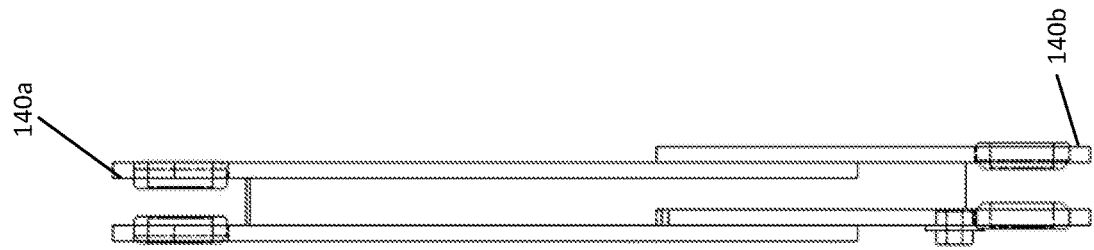
FIGS. 10A to 10C show perspective, side and front views, respectively, of a second link arm of the tailgate apparatus of FIG. 1.
Figure 10B:
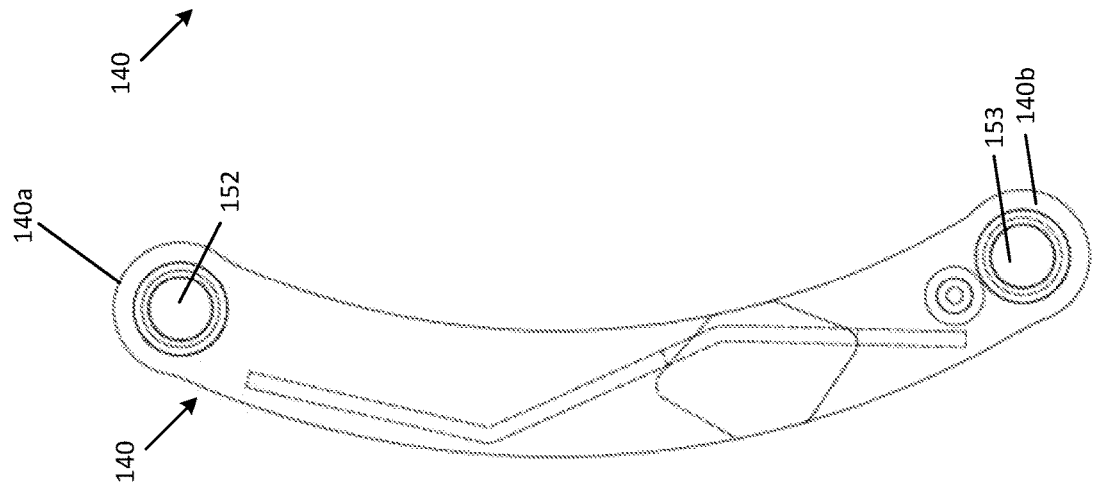
Figure 10A:
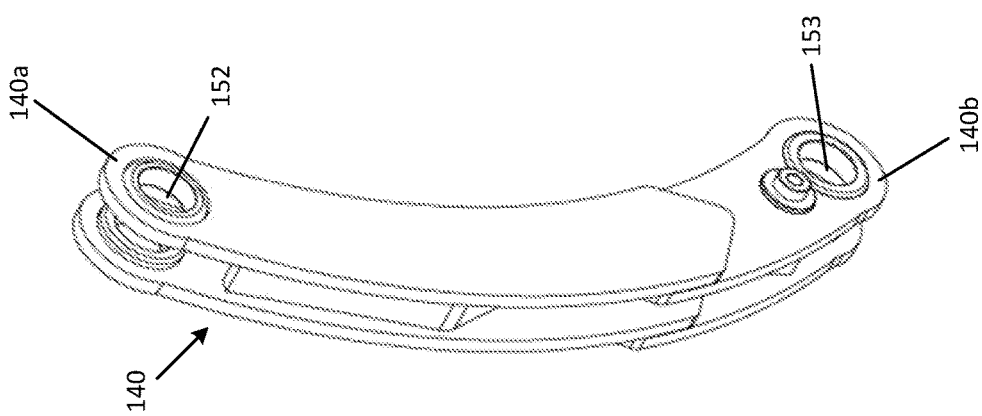

With respect to linkage 130, second link arm 140 has a first end 140a and a second end 140b (see FIGS. 10A-C). First end 140a has an upper aperture 152 and is pivotally coupled to the side arm 124 via upper aperture 152. In the embodiments shown in the drawings, first end 140a is pivotally coupled to forward end 124a of side arm 124 at a second pivot point 129.

Second link arm 140 pivots about a second pivot point 129 as the tailgate apparatus 102 moves between the open and closed positions. Second pivot point 129 is spaced apart from the side arm pivot point 125 (and therefore side arm pivot axis AA). Specifically, second pivot point 129 is spaced apart from the side arm pivot point 125 in a forward direction and in an upward direction when the tailgate apparatus 102 is in the closed position. Further, second pivot point 129 is spaced apart from the side arm pivot point 125 in a rearward direction and a downward direction from side arm pivot point 125 when the tailgate apparatus 102 is in the open position.

As noted above, second link arm 140 also has a lower aperture 153 and is coupled to the first link arm 138 near a second end 140b of the first link arm 138 via lower aperture 153. As shown, second link arm 140 has an arcuate (e.g. slightly curved) shape.

With respect to linkage 132, second link arm 140 has a first end 140a pivotally coupled to side wall 118. The remaining components and connections of linkage 132 are the same as previously described with reference to linkage 130.

With respect to linkage 130, actuator 136 is shown as a hydraulic cylinder having a forward end 136a and a rearward end 136b. Rearward end 136b is pivotally coupled to a rearward end 124b of side arm 124 and forward end 136a is pivotally coupled to second end 138b of first link arm 138.

As shown in the drawings, actuator 136 is configured to be fully extended when the tailgate apparatus 102 is in the closed position and fully retracted when the tailgate apparatus 102 is in the open position. Actuator 136 is positioned to be vertically spaced from the axis AA. As shown, actuator 136 is vertically spaced in a downward direction from the side arm pivot point 125. Actuator 136 has an axis of force FF that is directed onto the second end 138b of the first link arm 138.

In some embodiments, actuator 136 may have a cover 137 covering at least a portion thereof.

Referring now to FIG. 5, as the tailgate apparatus is moving from the closed position to the open position, actuator 136 retracts and pulls first link arm 138 rearwardly such that first link arm 138 pivots rearwardly about the first pivot point 144. As first link arm 138 pivots rearwardly, at least a portion of the pulling force applied by the actuator 136 to the first link arm 138 is transferred to a force that pulls both rearwardly and downwardly on the first end 140a at the second pivot point 129. Second end 140b of second link arm 140 moves both rearwardly and downwardly along an arcuate path defined by the second end 138b of the first link arm 138 as the first link arm 138 pivots rearwardly about the first pivot point 144. Rearward and downward movement of second link arm 140 is accompanied by rearward rotation of the second link arm 140 about the second pivot axis 129. Second pivot point 129 is forwardly and upwardly spaced from side arm pivot point 125 when the tailgate apparatus 102 is in the closed position, so when the downward component of the pulling force applied to the first end 140a of the second link arm 140 is transverse to the side arm 116, the tailgate apparatus 102 forwardly rotates about the side arm pivot point 125 from the closed position towards the open position.

As the tailgate apparatus 102 is forwardly rotating about the side arm pivot point 125 from the closed position towards the open position, the direction of the force applied by the actuator 136 on the first end 140a of the second link arm 140 changes such that the downward component of the force reduces. When the tailgate 122 is at a highest point of elevation above the floor 104, the force applied to the first end 140a of the second link arm 140 does not have a downward component.

To continue rotation of the tailgate apparatus 102 to the open position, at least a portion of the pulling force applied by the actuator 136 to the first link arm 138 is transferred to a force that pulls upwardly on the first end 140a at the second pivot point 129.

As the tailgate apparatus is moving from the open position to the closed position, actuator 136 extends and pushes first link arm 138 forwardly such that first link arm 138 pivots forwardly about the first pivot point 144. As first link arm 138 pivots forwardly, at least a portion of the pushing force applied by the actuator 136 to the first link arm 138 is transferred to a force that pushes both forwardly and downwardly on the first end 140a at the second pivot point 129. Second end 140b of second link arm 140 moves both forwardly and downwardly along an arcuate path defined by the second end 138b of the first link arm 138 as the first link arm 138 pivots forwardly about the first pivot point 144. Forward and downward movement of second link arm 140 is accompanied by forward rotation of the second link arm 140 about the second pivot axis 129. Second pivot point 129 is rearwardly and downwardly spaced from side arm pivot point 125 when the tailgate apparatus 102 is in the open position, so when the downward component of the pushing force applied to the first end 140a of the second link arm 140 is transverse to the side arm 124, the tailgate apparatus 102 rearwardly rotates about the side arm pivot point 125 from the open position towards the closed position.

As the tailgate apparatus 102 is rearwardly rotating about the side arm pivot point 125 from the closed position towards the open position, the direction of the force applied by the actuator 136 on the first end 140a of the second link arm 140 changes such that the downward component of the force reduces. When the tailgate 122 is at a highest point of elevation above the floor 104, the force applied to the first end 140a of the second link arm 140 does not have a downward component.

To continue rotation of the tailgate apparatus 102 to the closed position, at least a portion of the pushing force applied by the actuator 136 to the first link arm 138 is transferred to a force that pulls upwardly on the first end 140a at the second pivot point 129.

Actuator 136 may be controlled by an actuator control system (not shown) positioned either on the trailer 100, for example, or, in embodiments where the tailgate apparatus 102 is included on a vehicle, on or in the vehicle.

Tailgate apparatus 102 may also include one or more receiving portions 150 coupled to the tailgate 122 and/or one of the side arms 124, 126. Each receiving portion 150 may be configured to stop rotation of the tailgate apparatus 102 from the open position to the closed position. For instance, receiving portion 150 may be sized and shaped to receive a bar protruding from the dump body 101 such that rotation of the tailgate into the closed position results in the bar being inserted into the receiving portion. When the tailgate 122 is in the closed position, the tailgate apparatus 102 may rest on the bar of the dump body to remain in the closed position.

While the above description provides examples of one or more apparatus, methods, or systems, it will be appreciated that other apparatus, methods, or systems may be within the scope of the claims as interpreted by one of skill in the art.

What is claimed is:

1. A tailgate apparatus for a dump body, the dump body comprising a floor having a front end, a rear end and two opposed sides, a front wall coupled to the floor and extending upwardly from the floor at the front end, two opposing side walls extending upwardly from the floor, each side wall coupled to the floor at a respective side of the floor and coupled to the front wall, the two side walls defining an opening at the rear end of the floor, the tailgate apparatus comprising:
    a tailgate sized to cover the opening;
    two opposed side arms extending from opposing sides of the tailgate towards the front wall, each side arm pivotally coupled to a respective one of the side walls at a side arm pivot point; and
    a pair of linkages for linking the side arms to the side walls, the linkages being configured to enable the tailgate to pivot between a closed position where the tailgate covers the opening and an open position where the tailgate is positioned closer to the front wall than the opening, each linkage including an actuator configured to move the tailgate from the closed position towards the open position, the actuator having a forward end and a rearward end, the rearward end being coupled to the sidewall at a position rearward of the forward end when the tailgate is in the closed position.

2. The apparatus of claim 1, wherein each of the linkages comprises:
    a first link arm having a first end and a second end, the first end pivotally coupled to the side wall at a first pivot point spaced rearwardly a selected distance from the side arm pivot point; and
    a second link arm having a first end and a second end, the first end coupled to the side arm at a second pivot point spaced from the side arm pivot point and the second end coupled to the first link arm near the second end of the first link arm;
    wherein the rearward end of the actuator is pivotally coupled to the side wall at a rear end of the side wall and the forward end of the actuator is pivotally coupled to the second end of the first link arm.

3. The apparatus of claim 2, wherein each side arm pivots about a side arm pivot axis at the side arm pivot point.

4. The apparatus of claim 3, wherein each first link arm pivots about a first link arm pivot axis at the first pivot point.

5. The apparatus of claim 4, wherein the second link arm pivots about a second link arm pivot axis at the second pivot point.

6. The apparatus of claim 5, wherein the second pivot point is forwardly spaced from the side arm pivot point when the tailgate is in the closed position.

7. The apparatus of claim 6, wherein the second pivot point is upwardly spaced from the side arm pivot point when the tailgate is in the closed position.

8. The apparatus of claim 5, wherein the second pivot point is rearwardly spaced from the side arm pivot point when the tailgate is in the open position.

9. The apparatus of claim 5, wherein the second pivot point is downwardly spaced from the side arm pivot point when the tailgate is in the open position.

10. The apparatus of claim 5, wherein the second pivot point is forwardly spaced from the first pivot point.

11. The apparatus of claim 5, wherein the side arm pivot point is forwardly spaced from the first pivot point.

12. The apparatus of claim 5, wherein the side arm pivot axis is parallel to the first link arm pivot axis.

13. The apparatus of claim 2, wherein the second link arm has an arcuate shape.

14. A dump body comprising:
a floor having a front end, a rear end and two opposed sides;
a front wall coupled to the floor and extending upwardly from the floor at the front end;
two opposing side walls extending upwardly from the floor, each side wall coupled to the floor at a respective side of the floor and coupled to the front wall, the two side walls defining an opening at the rear end of the floor; and
a tailgate apparatus for the dump body, the tailgate apparatus comprising:
a tailgate sized to cover the opening;
two opposed side arms extending from opposing sides of the tailgate towards the front wall, each side arm pivotally coupled to a respective one of the side walls at a side arm pivot point; and
a pair of linkages for linking the side arms to the side walls, the linkages being configured to enable the tailgate to pivot between a closed position where the tailgate covers the opening and an open position where the tailgate is positioned closer to the front wall than the opening, each linkage including an actuator configured to move the tailgate from the closed position towards the open position, the actuator having a forward end and a rearward end, the rearward end being coupled to the sidewall at a position rearward of the forward end when the tailgate is in the closed position.

15. The dump body of claim 14, wherein each of the linkages comprises:
a first link arm having a first end and a second end, the first end pivotally coupled to the side wall at a first pivot point spaced rearwardly a selected distance from the side arm pivot point; and
a second link arm having a first end and a second end, the first end coupled to the side arm at a second pivot point spaced from the side arm pivot point and the second end coupled to the first link arm near the second end of the first link arm;
wherein the rearward end of the actuator is pivotally coupled to the side wall at a rear end of the side wall and the forward end of the actuator is pivotally coupled to the second end of the first link arm.

16. The dump body of claim 15, wherein each side arm pivots about a side arm pivot axis at the side arm pivot point.

17. The dump body of claim 16, wherein each first link arm pivots about a first link arm pivot axis at the first pivot point.

18. A vehicle comprising:
a dump body comprising:
a floor having a front end, a rear end and two opposed sides;
a front wall coupled to the floor and extending upwardly from the floor at the front end;
two opposing side walls extending upwardly from the floor, each side wall coupled to the floor at a respective side of the floor and coupled to the front wall, the two side walls defining an opening at the rear end of the floor; and
a tailgate apparatus for the dump body, the tailgate apparatus comprising:
a tailgate sized to cover the opening;
two opposed side arms extending from opposing sides of the tailgate towards the front wall, each side arm pivotally coupled to a respective one of the side walls at a side arm pivot point; and
a pair of linkages for linking the side arms to the side walls, the linkages being configured to enable the tailgate to pivot between a closed position where the tailgate covers the opening and an open position where the tailgate is positioned closer to the front wall than the opening, each linkage including an actuator configured to move the tailgate from the closed position towards the open position, the actuator having a forward end and a rearward end, the rearward end being coupled to the sidewall at a position rearward of the forward end when the tailgate is in the closed position.

19. The vehicle of claim 18, wherein each of the linkages further comprises:
a first link arm having a first end and a second end, the first end pivotally coupled to the side wall at a first pivot point spaced rearwardly a selected distance from the side arm pivot point; and
a second link arm having a first end and a second end, the first end coupled to the side arm at a second pivot point spaced from the side arm pivot point and the second end coupled to the first link arm near the second end of the first link arm;
wherein the rearward end of the actuator is pivotally coupled to the side wall at a rear end of the side wall and the forward end of the actuator is pivotally coupled to the second end of the first link arm.

20. The vehicle of claim 19, wherein each side arm pivots about a side arm pivot axis at the side arm pivot point.

21. The vehicle of claim 20, wherein each first link arm pivots about a first link arm pivot axis at the first pivot point.

\* \* \* \* \*